Figure 1:
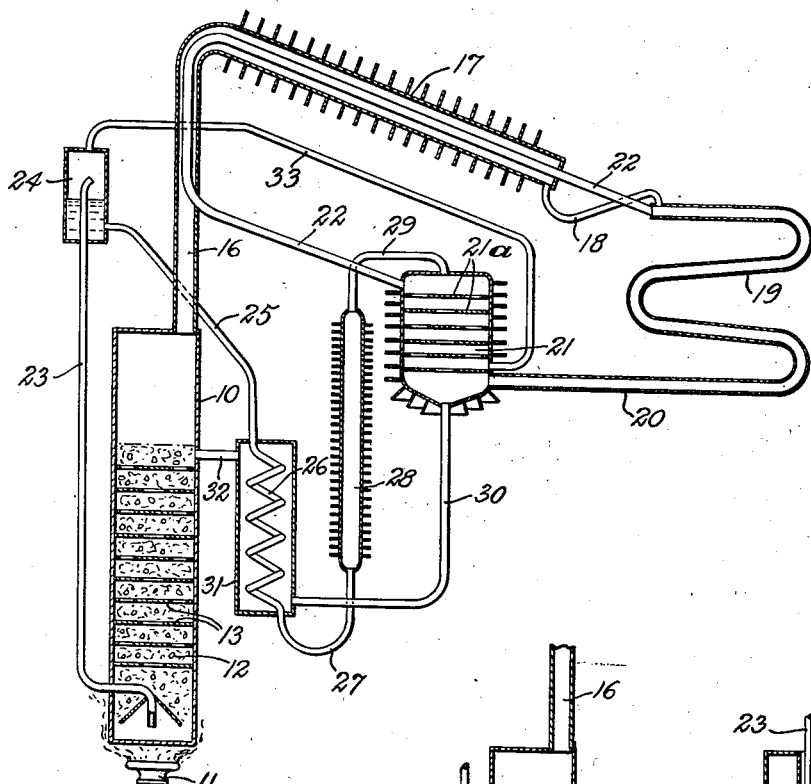

April 25, 1933.   G. MAIURI ET AL   1,905,727
ABSORPTION REFRIGERATING SYSTEM
Filed June 9, 1930

INVENTORS
Guido Maiuri
Raoul Felice Bossini
BY
ATTORNEY

Patented Apr. 25, 1933

1,905,727

UNITED STATES PATENT OFFICE

GUIDO MAIURI AND RAOUL FELICE BOSSINI, OF LONDON, ENGLAND, ASSIGNORS, BY MESNE ASSIGNMENTS, TO ELECTROLUX SERVEL CORPORATION, A CORPORATION OF DELAWARE

ABSORPTION REFRIGERATING SYSTEM

Application filed June 9, 1930, Serial No. 460,018, and in Great Britain October 29, 1929.

Our invention relates to absorption refrigerating systems and more particularly to the process of vapor expulsion carried out in that vessel of the system which is known as the boiler or generator.

The invention includes methods of vapor expulsion and of rectification of vapors and also means for carrying out said methods.

In generators of absorption refrigerating systems, whether of the continuous, intermittent or reversing type, the turbulent motion of the liquid set up by the expulsion of vapor and by convection on heating said liquid is of such violence that even when the generator is of considerable length and heat is applied only at the bottom thereof, the composition of the liquid and the temperature thereof remain substantially constant throughout the length of the generator. As the composition of the evolved vapor is determined by the temperature of the weak liquor which, as above mentioned, is constant, the vapors include a considerable amount of vapor of absorption liquid. Also, since the absorption liquid is of substantially uniform strength, the liquid available for supply to the absorber is not very weak.

In the present invention, the difference in viscosity between liquid and vapor is utilized to stratify the liquid into strata of different strengths and also to effect rectification of the refrigerant vapor within the generator.

For this purpose, according to the invention, means is provided within the generator for restraining turbulence and convection action of the liquid. The restraining means may provide small interstices which are readily traversed by ascending vapor but which impose such resistance to the rapid flow of liquid therethrough that the temperature of the liquid progressively decreases from the bottom upwards.

The application of the heat to, as well as the judicious cooling of the generator, may be arranged so as to obtain the desired temperatures at different heights of the generator, so as to effect proper rectification.

Alternatively an inordinately long passage of flow relatively to the depth of the liquid may be provided for the liquid and vapor in the generator.

The vapor of absorption liquid, for instance water, contained in the ascending bubbles of vapor, of which those generated in the lower and consequently hotter portions of the generator are composed of a larger proportion of vapor of the absorption liquid than those generated higher up, is progressively condensed as it passes through the superlying colder strata of liquid. The latent heat of condensation of the absorption liquid thus released is utilized for generating vapor of the refrigerant, for instance ammonia, from the superlying stronger and cooler strata of liquid, until finally almost pure vapor of the refrigerant alone issues at the top of the liquid in the generator, the uppermost stratum of which is very strong absorption liquid. Thus the vapor is rectified not merely within the generator, but also within the liquid in the generator.

Moreover as the hottest liquid is concentrated at, or confined to, the bottom of the generator, such liquid will be the weakest, and is available as such for return to the absorber in a continuous absorption refrigerating system.

Figures 2, 3:
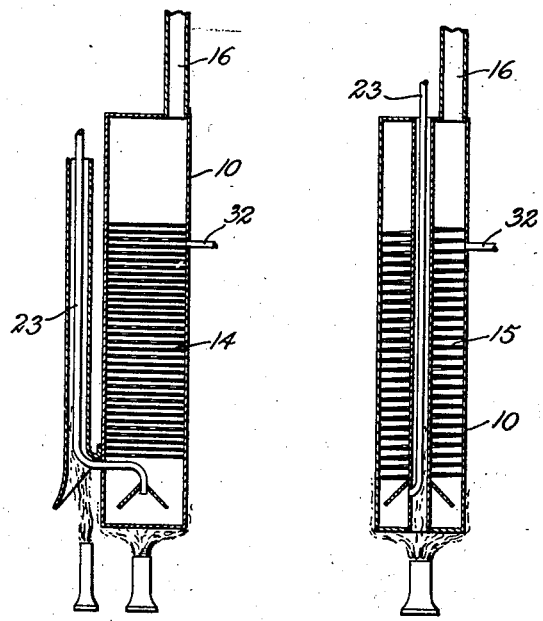

In order that our invention may be properly understood and readily carried into effect, we have illustrated by drawing examples of generators of absorption refrigerating apparatuses provided small interstices for the restraint of turbulence and convection of the liquor therein, of which Figure 1 is a diagrammatic sectional elevation of a continuous absorption refrigerating apparatus including a generator and embodying the invention; and Figures 2 and 3 are diagrammatic sectional elevations of alternative constructions of generators.

Referring more particularly to Figure 1 of the drawing, 10 is the generator or boiler, heated at the bottom by a gas burner 11. The interior of the generator 10 is filled for a considerable depth, and in fact throughout the liquid space, with small loose inert bodies 12, such as glass balls or beads, shot or coarse sand, or metallic netting, or small rings or tubes of diameter equal to length, or short metal spirals of convenient size. These bodies 12 are packed between horizontal baffles 13 leaving openings alternately at the middle and periphery of the generator 10. Such baffles may not be necessary for all cases and size of apparatus.

The bodies 12 serve to restrain turbulence and convection of the liquid and thus obtain progressively cooler strata of liquid upwards, owing to the friction imposed to rapid flow of liquid through the small interstices between them. Owing to the vastly lesser viscosity of the generated vapor relatively to the viscosity of the liquid, such vapor can, however, readily ascend through these interstices.

Alternatively to providing small interstices between small bodies 12 packed into the liquid space of the boiler 10, the liquid space may, as shown in Figure 2, be occupied by mutually closely adjacent superposed finely perforated partitions 14.

Instead of relying on small interstices to impose the required frictional restraint on the flow of the liquid in the generator, such frictional restraint can be supplied by providing an extremely long passage of flow for the liquid and vapor in and relatively to the depth of the liquid space in the generator. This is shown in Figure 3, wherein the ascending and descending passage of flow in the liquid space is caused to be extremely long by a continuous helical partition 15 of small pitch located in the liquid space of the generator 10. Small bodies may also be inserted so as to fill the spaces between the spirals.

Referring to the remainder of the system illustrated in Figure 1, 16 is a pipe through which the vaporized refrigerant, already rectified in the generator 10 as above explained, passes from the generator 10 to a condenser 17, wherein it is condensed. The condensed refrigerant flows through a trapped pipe 18 to an evaporator 19, wherein it vaporizes and produces the desired refrigerating effect. From the evaporator 19 the vaporized refrigerant passes through a pipe 20 to the bottom of an absorber 21 where it meets, and is absorbed by, weak absorption liquid coming from the generator 10.

As usual in continuous absorption machines, the evaporator 19 and the absorber 21 contain an inert pressure equalizing gas, which flows from the top of the absorber 21 back to the top of the evaporator 19 through a pipe 22.

Weak absorption liquid from the bottom of the generator 10 is raised through a pipe 23 by the thermo-syphon action of bubbles of vapor and flows out of the top of such pipe 23 into a receptacle 24. From the receptacle 24 the weak liquid flows by gravity through a pipe 25, a coil 26 of a heat exchanger 31, a pipe 27, a second cooler 28 and a pipe 29 into the top of the absorber 21.

The vapor which enters the receptacle 24 along with the weak liquid is lead off to the absorber through the pipe 33.

The weak liquid descends over baffles 21a in the absorber 21 encountering therein the ascending mixed refrigerant vapor and inert gas, whereby the refrigerant vapor becomes absorbed by and enriches the weak liquid. The inert gas passes back to the evaporator 19 through the above mentioned pipe 22.

The liquid, now enriched by the absorption of refrigerant vapor, flows from the bottom of the absorber 21, through a pipe 30 through a heat exchanger 31 containing the above mentioned coil 26, wherein it takes up heat from the weak liquid, and thence through a pipe 32 into the top of the liquid space in the generator 10.

The liquid progressively descends in the liquid space in the generator 10 through the interstices between the small bodies 12, and in so descending becomes progressively hotter and progressively weaker, and eventually, as very weak liquid, or even as pure water is again raised through the pipe 23.

It will be obvious to those skilled in the art that the invention may be embodied in other structures.

We claim:

1. In a generator of an absorption refrigerating apparatus, means presenting small interstices located mutually closely adjacent throughout substantially the entire depth of the liquid space of said generator for restraining vertical movement of the liquid within said space.

2. In a generator of an absorption refrigerating apparatus, small bodies located mutually closely adjacent throughout substantially the entire depth of the liquid space of said generator for restraining vertical movement of the liquid within said space.

3. In a generator of an absorption refrigerating apparatus, superposed staggered baffles at intervals throughout substantially the entire depth of the liquor space of said generator, and small bodies located mutually closely adjacent between said baffles.

4. That improvement in the art of refrigeration which comprises maintaining a body of a solution of absorption liquid and refrigerant of extended length, introducing strong solution at one end of said body, withdrawing weak solution from the other end of said body to produce vapor, heating said body and producing progressively different concentrations of said solution along the length of said body by substantially continuously restraining lengthwise movement of the solution while causing vapor to flow in counter-current to liquid in the body.

5. That improvement in the art of refrigeration which comprises maintaining a vertical column of a solution of absorption liquid and refrigerant, introducing strong solution at the upper end of said column, withdrawing weak solution from the lower end of said column, heating said column and producing progessively different concentrations of said solution along the length of said column by causing vertical movement of the solution through a multitude of capillary orifices.

6. That improvement in the art of refrigeration which comprises maintaining a body of a solution of absorption liquid and refrigerant of extended length, introducing strong solution at one end of said body, withdrawing weak solution from the other end of said body, applying heat to said other end of said body, and producing progressively different concentrations of said solution along the length of said body by causing lengthwise movement of the solution through a multitude of closely adjacent capillary orifices while causing vapor to flow in counter current to liquid in the body.

7. That improvement in the art of refrigeration which comprises maintaining a vertical column of a solution of absorption liquid and refrigerant, introducing strong solution at the upper end of said column, withdrawing weak solution from the lower end of said column, applying heat to the lower end of said column, and producing progressively different concentrations of said solution along the entire length of said column by causing vertical movement of the solution through a multitude of closely adjacent capillary orifices.

8. That improvement in the art of refrigeration which comprises maintaining a body of a solution of absorption liquid and refrigerant of extended length, introducing strong solution at one end of said body, withdrawing weak solution from the other end of said body, heating said body to evolve gaseous refrigerant from solution, producing progressively different concentrations of said solution along the length of said body by causing lengthwise movement of the solution through a multitude of closely adjacent capillary orifices, and passing the gaseous refrigerant evolved from the weaker solution through the progressively stronger solution.

9. That improvement in the art of refrigeration which comprises maintaining a vertical column of a solution of absorption liquid and refrigerant, introducing strong solution at the upper end of said column, withdrawing weak solution from the lower end of said column, heating said column to evolve gaseous refrigerant from solution, producing progressively different concentrations of said solution along the length of said column by causing vertical movement of the solution through a multitude of interstices under substantially continuous external frictional resistance, and passing the gaseous refrigerant evolved from the weaker solution upwardly through the progressively stronger solution.

10. That improvement in the art of refrigeration which comprises maintaining a body of a solution of absorption liquid and refrigerant of extended length, introducing strong solution at one end of said body, withdrawing weak solution from the other end of said body, applying heat to said other end of said body to evolve gaseous refrigerant from solution, producing progressively different concentrations of said solution along the length of said body by causing lengthwise movement of the solution through a multitude of interstices under substantially continuous external frictional resistance, and passing the gaseous refrigerant evolved from the weaker solution through the progressively stronger solution.

11. That improvement in the art of refrigeration which comprises maintaining a vertical column of a solution of absorption liquid and refrigerant, introducing strong solution at the upper end of said column, withdrawing weak solution from the lower end of said column, applying heat to the lower end of said column to evolve gaseous refrigerant from solution, producing progressively different concentrations of said solution along the length of said column by causing vertical movement of the solution through a multitude of fine interstices under substantially continuous external frictional resistance, and passing the gaseous refrigerant evolved from the weaker solution upwardly through the progressively stronger solution.

12. In an absorption refrigerating apparatus, an elongated generator for containing a solution of absorption liquid and refrigerant, means for introducing strong solution at one end of said generator, means for withdrawing weak solution from the other end of said generator, means for heating said generator and means presenting a multitude of small interstices offering relatively great resistance to flow of liquid located closely adjacent to each other throughout substantially the entire space occupied by the solution in said generator for producing progressively different concentrations of said solution along the length of the generator by restraining lengthwise movement of the solution.

13. In an absorption refrigerating apparatus, a vertical generator for containing a solution of absorption liquid and refrigerant, means for introducing strong solution at the upper end of said generator, means for withdrawing weak solution from the lower end of said generator, means for heating said generator and means presenting a multitude of small interstices offering relatively great resistance to flow of liquid located closely adjacent to each other throughout substantially the entire space occupied by the solution in said generator for producing progressively different concentrations of said solution along the length of the generator by restraining vertical movement of the solution.

14. In an absorption refrigerating apparatus, an elongated generator for containing a solution of absorption liquid and refrigerant, means for introducing strong solution at one end of said generator, means for withdrawing weak solution from the other end of said generator, means for heating said generator and a multitude of small bodies located closely adjacent to each other throughout substantially the entire space occupied by the solution in said generator for producing progressively different concentrations of said solution along the length of the generator by restraining lengthwise movement of the solution.

15. In an absorption refrigerating apparatus, a vertical generator for containing a solution of absorption liquid and refrigerant, means for introducing strong solution at the upper end of said generator, means for withdrawing weak solution from the lower end of said generator, means for heating said generator and a multitude of small bodies located closely adjacent to each other throughout substantially the entire space occupied by the solution in said generator for producing progressively different concentrations of said solution along the length of the generator by restraining vertical movement of the solution.

16. In an absorption refrigerating apparatus, an elongated generator for containing a solution of absorption liquid and refrigerant, means for introducing strong solution at one end of said generator, means for withdrawing weak solution from the other end of said generator, means for heating said generator, a large number of closely spaced baffles located within said generator throughout substantially the entire space occupied by the solution therein, and small bodies located closely adjacent to each other between said baffles.

17. In an absorption refrigerating apparatus, a vertical generator for containing a solution of absorption liquid and refrigerant, means for introducing strong solution at the upper end of said generator, means for withdrawing weak solution from the lower end of said generator, means for heating said generator, a series of spaced baffles located within said generator throughout substantially the entire space occupied by the solution therein, and small bodies located closely adjacent to each other between said baffles.

18. An absorption refrigerating apparatus comprising a generator, an absorber, means for introducing a strong solution of absorption liquid and refrigerant from said absorber into the upper part of said generator, means for circulating a weak solution of absorption liquid and refrigerant from the lower part of said generator to said absorber, and means for producing progressively different concentrations of said solution along said generator between the upper and lower parts thereof by constraining vertical movement of said solution to a substantially continuously subdivided path of flow in a multitude of small interstices.

19. An absorption refrigerating apparatus comprising a generator, an absorber, means for introducing a strong solution of absorption liquid and refrigerant from said absorber into the upper part of said generator, means for circulating a weak solution of absorption liquid and refrigerant from the lower part of said generator to said absorber, and means presenting small interstices located closely adjacent to each other throughout substantially the entire space occupied by the solution in said generator for producing progressively different concentrations of said solution along said generator between the upper and lower parts thereof by restraining vertical movement of said solution.

20. An absorption refrigerating apparatus comprising a generator, an absorber, means for introducing a strong solution of absorption liquid and refrigerant from said absorber into the upper part of said generator, means for circulating a weak solution of absorption liquid and refrigerant from the lower part of said generator to said absorber, and a plurality of small bodies located closely adjacent to each other throughout substantially the entire space occupied by the solution in said generator for producing progressively different concentrations of said solution along said generator between the upper and lower parts thereof by restraining vertical movement of said solution.

21. An absorption refrigerating apparatus comprising a generator, an absorber, means for introducing a strong solution of absorption liquid and refrigerant from said absorber into the upper part of said generator, means for circulating a weak solution of absorption liquid and refrigerant from the lower part of said generator to said absorber, a series of spaced baffles located within said generator throughout substantially the entire space occupied by said solution, and small bodies located closely adjacent to each other between said baffles.

22. An absorption refrigerating apparatus comprising a generator, an absorber, means for introducing a strong solution of absorbtion liquid and refrigerant from said absorber into the upper part of said generator, means for circulating a weak solution of absorption liquid and refrigerant from the lower part of said generator to said absorber, and a helical partition located within said generator.

23. In an absorption refrigerating apparatus, a vessel adapted to hold a vertical column of solution of absorption liquid and refrigerant, means for supplying strong solution to the upper part of said column, means for withdrawing weak solution from the lower part of said column, means for heating said column to cause vapor to flow upwardly therein, and a plurality of small solid bodies loosely packed in said liquid column.

24. Apparatus as set forth in claim 23 in which the small solid bodies comprise glass balls or beads, small shot, coarse sand, or the like.

25. Apparatus as set forth in claim 23 in which the small solid bodies comprise small iron tubes of a diameter substantially equal to their length.

26. Apparatus as set forth in claim 23 in which the solid bodies are separated into layers by apertured partitions.

27. In an absorption refrigerating apparatus, a vessel adapted to hold a vertical column of solution of absorption liquid and refrigerant, means for supplying strong solution to the upper part of said column, means for withdrawing weak solution from the lower part of said column, means for heating said column to cause vapor to flow upwardly therein, and a spiral member within said liquid column for producing progressively different concentrations of said solution along the length of said column.

28. In an absorption refrigerating apparatus, an absorber, a vessel adapted to hold a vertical column of solution of absorption liquid and refrigerant, means for conducting strong absorption liquid from said absorber to the upper part of said column, means to heat the lower part of said column to cause vapor to flow upwardly therein, means within said liquid column for producing progressively different concentrations of said solution along the length of said column, and thermo-syphon means for lifting liquid from the lower part of said column to the absorber.

29. In an absorption refrigerating apparatus, an absorber, a vessel adapted to hold a vertical column of solution of absorption liquid and refrigerant, means for conducting strong absorption liquid from said absorber to the upper part of said column, means to heat the lower part of said column to cause vapor to flow upwardly therein, a plurality of small solid bodies within said liquid column for producing progressively different concentrations of said solution along the length of said column, and thermo-syphon means for lifting liquid from the lower part of said column to the absorber.

30. In an absorption refrigerating apparatus, an absorber, a vessel adapted to hold a vertical column of solution of absorption liquid and refrigerant, means for conducting strong absorption liquid from said absorber to the upper part of said column, means to heat the lower part of said column to cause vapor to flow upwardly therein, a plurality of baffles and small bodies between said baffles within said liquid column for producing progressively different concentrations of said solution along the length of said column, and thermo-syphon means for lifting liquid from the lower part of said column to the absorber.

31. In an absorption refrigerating apparatus, an absorber, a vessel adapted to hold a vertical column of solution of absorption liquid and refrigerant, means for conducting strong absorption liquid from said absorber to the upper part of said column, means to heat the lower part of said column to cause vapor to flow upwardly therein, a spiral metal member within said liquid column for producing progressively different concentrations of said solution along the length of said column, and thermo-syphon means for lifting liquid from the lower part of said column to the absorber.

GUIDO MAIURI.
RAOUL FELICE BOSSINI.

CERTIFICATE OF CORRECTION.

Patent No. 1,905,727. April 25, 1933.

GUIDO MAIURI, ET AL.

It is hereby certified that error appears in the printed specification of the above numbered patent requiring correction as follows: Page 2, line 126, claim 4, strike out the words "to produce vapor", and line 127, after "body" insert the word and comma "to produce vapor,"; and that the said Letters Patent should be read with these corrections therein that the same may conform to the record of the case in the Patent Office.

Signed and sealed this 8th day of August, A. D. 1933.

M. J. Moore.

(Seal) Acting Commissioner of Patents.